(12) United States Patent
Allely et al.

(10) Patent No.: US 10,947,608 B2
(45) Date of Patent: Mar. 16, 2021

(54) STEEL SHEET COATED WITH A METALLIC COATING BASED ON ALUMINUM AND COMPRISING TITANIUM

(71) Applicant: ArcelorMittal, Luxembourg (LU)

(72) Inventors: Christian Allely, Maizières-lès-Metz (FR); Tiago Machado Amorim, Longeville les Metz (FR); Beril Corlu, Ghent (BE); Joost De Strycker, Zele (BE)

(73) Assignee: ArcelorMittal, Luxembourg (LU)

( * ) Notice: Subject to any disclaimer, the term of this patent is extended or adjusted under 35 U.S.C. 154(b) by 79 days.

(21) Appl. No.: 15/765,831

(22) PCT Filed: Sep. 30, 2016

(86) PCT No.: PCT/IB2016/001398
§ 371 (c)(1),
(2) Date: Apr. 4, 2018

(87) PCT Pub. No.: WO2017/060763
PCT Pub. Date: Apr. 13, 2017

(65) Prior Publication Data
US 2018/0274062 A1 Sep. 27, 2018

(30) Foreign Application Priority Data

Oct. 5, 2015 (WO) .................. PCT/IB2015/001773

(51) Int. Cl.
| B32B 15/01 | (2006.01) |
| C22C 21/10 | (2006.01) |
| C23C 2/12 | (2006.01) |

(Continued)

(52) U.S. Cl.
CPC ............ *C22C 21/10* (2013.01); *B32B 15/012* (2013.01); *C21D 1/673* (2013.01); *C23C 2/12* (2013.01);
(Continued)

(58) Field of Classification Search
None
See application file for complete search history.

(56) References Cited

U.S. PATENT DOCUMENTS 2,782,493 A * 2/1957 Russell ..................... C23C 2/12
428/653
5,571,566 A 11/1996 Cho
(Continued)

FOREIGN PATENT DOCUMENTS

AU 553243 B2 7/1986
BY 10190 C1 2/2008
(Continued)

*Primary Examiner* — Seth Dumbris
(74) *Attorney, Agent, or Firm* — Davidson, Davidson & Kappel, LLC

(57) ABSTRACT

A steel sheet coated with a metallic coating is provided. The coating includes from 1.0 to 22.0% by weight of zinc, from 0.1 to 1.0% by weight of titanium, from 1.6 to 15.0% by weight of silicon, below 0.5% by weight of magnesium, below 0.05% by weight of La or Ce or both, below 0.2% by weight of Sn and optionally, less than 0.3% by weight of additional elements chosen from Sb, Pb, Ca, Mn, Cr, Ni, Zr, In, Hf or Bi. A balance of the coating includes aluminum and optionally unavoidable impurities and residual elements. A microstructure of the coating does not include Al—Zn binary phases. A coated part is also provided.

25 Claims, 1 Drawing Sheet

(51) Int. Cl.
*C21D 1/673* (2006.01)
*C23C 2/40* (2006.01)

(52) U.S. Cl.
CPC ............ *C23C 2/40* (2013.01); *B32B 2605/00* (2013.01); *C21D 2211/002* (2013.01); *C21D 2211/008* (2013.01); *Y10T 428/12757* (2015.01)

(56) References Cited

U.S. PATENT DOCUMENTS

| | | | |
|---|---|---|---|
| 7,867,344 B2 | 1/2011 | Kusumi et al. | |
| 8,663,818 B2 | 3/2014 | Nose et al. | |
| 8,785,000 B2 | 7/2014 | Maalman et al. | |
| 2003/0108765 A1* | 6/2003 | Humer | C22C 21/02 428/650 |
| 2005/0142294 A1 | 6/2005 | Marutian et al. | |
| 2007/0026255 A1* | 2/2007 | Schubert | C22C 21/003 428/653 |
| 2007/0163685 A1 | 7/2007 | Kusumi et al. | |
| 2010/0139816 A1 | 6/2010 | Hanlon et al. | |
| 2012/0135271 A1 | 5/2012 | Ooi et al. | |
| 2015/0284861 A1* | 10/2015 | Allely | C21D 8/0278 204/196.1 |
| 2015/0337428 A1* | 11/2015 | Ooi | C23C 2/06 428/659 |
| 2017/0166991 A1 | 6/2017 | Bello et al. | |

FOREIGN PATENT DOCUMENTS

| | | |
|---|---|---|
| CN | 101457320 A | 6/2009 |
| CN | 101880800 A | 11/2010 |
| CN | 102449183 A | 5/2012 |
| CN | 104955975 A | 9/2015 |
| EP | 1225246 A1 | 7/2002 |
| EP | 1997927 A1 | 12/2008 |
| JP | H0849055 A | 2/1996 |
| JP | H09111433 A | 4/1997 |
| JP | 2001073108 A | 3/2001 |
| JP | 2005290418 A | 10/2005 |
| JP | 2006051543 A | 2/2006 |
| JP | 2006161111 A | 6/2006 |
| JP | 2010229483 A | 10/2010 |
| JP | 2011512455 A | 4/2011 |
| JP | 2014148713 A | 8/2014 |
| JP | 2014148715 A | 8/2014 |
| RU | 2202649 C1 | 4/2003 |
| RU | 2379373 C1 | 1/2010 |
| RU | 2379393 C1 | 1/2010 |
| RU | 2384648 C2 | 3/2010 |
| RU | 2464338 C2 | 10/2012 |
| UA | 3766 C1 | 12/1994 |
| WO | 2006104420 A2 | 10/2006 |
| WO | 2009090555 A1 | 7/2009 |

* cited by examiner

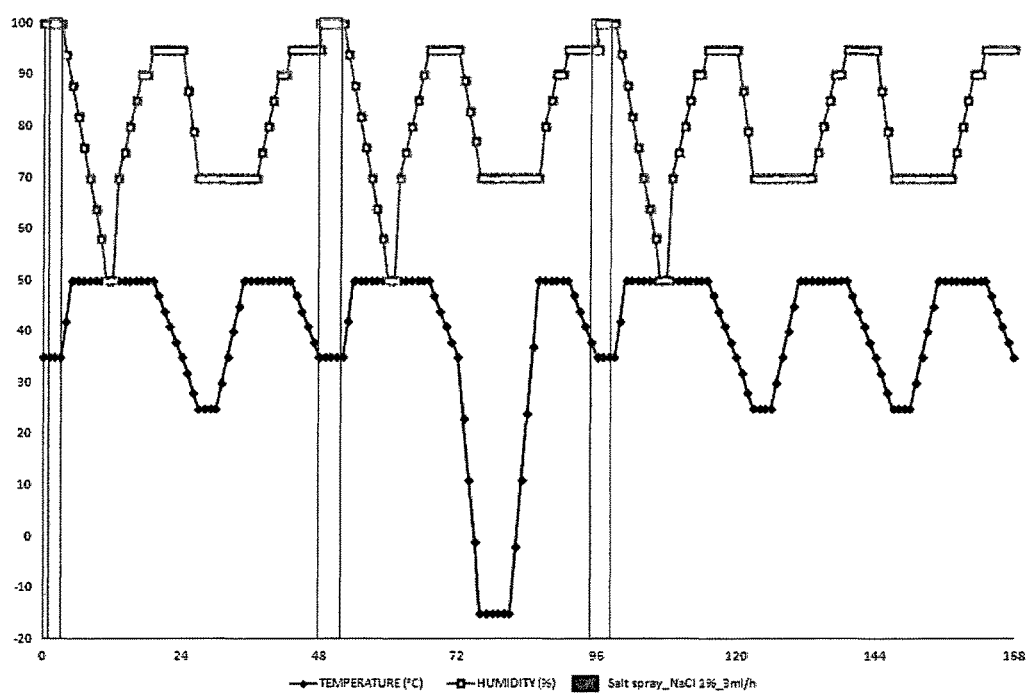

STEEL SHEET COATED WITH A METALLIC COATING BASED ON ALUMINUM AND COMPRISING TITANIUM

The present invention relates to a steel sheet coated with a metallic coating having sacrificial protection. The invention is particularly well suited for the manufacture of automotive vehicles.

BACKGROUND

Zinc-based coatings are generally used because they allows for a protection against corrosion thanks to barrier protection and cathodic protection. The barrier effect is obtained by the application of a metallic coating on steel surface. Thus, metallic coatings prevent the contact between steel and corrosive atmosphere. The barrier effect is independent from the nature of coating and substrate. On the contrary, sacrificial cathodic protection is based on the fact that zinc is a metal less noble that steel. Thus, if corrosion occurs, zinc is consumed preferentially to steel. Cathodic protection is essential in areas where steel is directly exposed to corrosive atmosphere, like cut edges where surrounding zinc will be consumed before steel.

However, because of low melting point of zinc, during welding, there is a risk that zinc evaporates. In order to solve this problem, it is possible to reduce the thickness of the coating, but the protection time against corrosion is also reduced. Additionally, when press hardening process is performed on such zinc coated steel sheets, for example by hot-stamping, microcracks are observed in steel which spread from the coating. Finally, the step of painting of some hardened parts coated with zinc necessitates sanding operations before phosphatation due to the presence of a weak layer of oxides at the part surface.

Other metallic coatings usually used for the production of automotive vehicle are aluminum and silicon based coatings. There is no microcrack in steel when press hardening process is performed due to the presence of an intermetallic layer Al—Si—Fe. Moreover, they have a good aptitude for painting. They allow for a protection by barrier effect and can be welded. However, they do not allow for a cathodic protection or they have a very low cathodic protection.

The patent application EP1225246 discloses a Zn—Al—Mg—Si alloy-plated material wherein the coating comprises, in terms of weight %, Al: at least 45% and no greater than 70%, Mg: at least 3% and less than 10%, Si: at least 3% and less than 10%, with the remainder Zn and unavoidable impurities, wherein the Al/Zn ratio is 0.89-2.75 and the plating layer contains a bulky $Mg_2Si$ phase. It also discloses a Zn—Al—Mg—Si alloy-plated steel material wherein the coating comprises, in terms of weight %, Al: at least 45% and no greater than 70%, Mg: at least 1% and less than 5%, Si: at least 0.5% and less than 3%, with the remainder Zn and unavoidable impurities, wherein the Al/Zn ratio is 0.89-2.75 and the plating layer contains a scaly $Mg_2Si$ phase. These specific coatings show unpainted corrosion resistance and edge creep resistance at cut edge sections after painting.

A Zn—Al—Mg—Si alloy-plated steel material can further comprises one or more from among In: 0.01-1.0%, Sn: 0.1-10.0%, Ca: 0.01-0.5%, Be: 0.01-0.2%, Ti: 0.01-0.2%, Cu: 0.1-1.0%, Ni: 0.01-0.2%, Co: 0.01-0.3%, Cr: 0.01-0.2%, Mn: 0.01-0.5%, Fe: 0.01-3.0% and Sr: 0.01-0.5%. The purpose of adding one or more these elements is to further improve the plating corrosion resistance. Indeed, it is believed that addition of these elements further promotes passivation of the film produced on the plating surface.

However, the fabrication of specific $Mg_2Si$ phases, scaly or bulky, is complex. Indeed, it has to respect the size and the ratio of the short diameter mean size with respect to the long diameter of $Mg_2Si$ phases, as observed with a 5° polished cross-section. Moreover, the fabrication of $Mg_2Si$ phases depends on the quantity of Mg and Si.

BRIEF SUMMARY OF THE INVENTION

From an industrial point of view, $Mg_2Si$ phases can be difficult to obtain because of these specifics criteria. Therefore, there is a risk that the desired $Mg_2Si$ phase is not obtained.

An object of the invention is to provide a coated steel sheet easy to form having a reinforced protection against corrosion, i.e. a sacrificial cathodic protection in addition to barrier protection, before and after the forming.

In terms of sacrificial protective corrosion, electrochemical potential has to be at least 50 mV more negative than the potential of steel, i.e. a maximum potential of −0.78V with respect to a saturated calomel electrode (SCE). It is preferable not to decrease the potential at a value of −1.4V/SCE, even −1.25V/SCE which would involve a fast consumption and would finally decrease the period of protection of steel.

The present invention provides a steel sheet coated with a metallic coating. The metallic coating includes from 1.0 to 22.0% by weight of zinc, from 0.1 to 1.0% by weight of titanium, from 1.6 to 15.0% by weight of silicon, below 0.5% by weight of magnesium, below 0.05% by weight of La or Ce or both, below 0.2% by weight of Sn and optionally additional elements chosen from Sb, Pb, Ca, Mn, Cr, Ni, Zr, In, Hf or Bi, the content by weight of each additional element being inferior to 0.3% by weight. A balance of the coating includes aluminum and optionally unavoidable impurities and residual elements. A microstructure of the coating does not comprise Al—Zn binary phases The coated steel sheet may also comprise any of the following characteristics taken alone or in combination.

the coating comprises from 5.0 to 20.0% by weight of zinc;
the coating comprises from 10.0 to 20.0% by weight of zinc;
the coating comprises from 10.0 to 15.0% by weight of zinc;
the coating comprises from 0.15 to 1.0% of weight of titanium;
the coating comprises from 0.15 to 0.50% of weight of titanium;
the coating comprises from 0.15 to 0.30% of weight of titanium;
the coating comprises from 0.20 to 0.30% of weight of titanium;
the coating comprises from 0.21 to 0.30 of weight of titanium;
the coating comprises from 2.05 to 11.0% by weight of silicon;
the coating comprises from 5.0 to 11.0% by weight of silicon;
the coating comprises from 7.0 to 11.0% by weight of silicon;
the coating comprises below 0.2% by weight of magnesium;
the microstructure of the coating comprises Zn solid solution in Al phase and Si-rich phases; and
the thickness of the coating is between 5 and 50 μm.

The invention also covers parts coated with the metallic coating.

The invention also covers the use of a coated part for the manufacture of an automotive vehicle.

BRIEF DESCRIPTION OF THE FIGURE

To illustrate the invention, various embodiments and trials of non-limiting examples will be described, particularly with reference to the following FIGURE:

FIG. 1 illustrates one corrosion cycle corresponding to 168 hours of the norm VDA 233-102.

DETAILED DESCRIPTION

Other characteristics and advantages of the invention will become apparent from the following detailed description of the invention.

Any steel can be advantageously used in the frame of the invention. However, in case steel having high mechanical strength is needed, in particular for parts of structure of automotive vehicle, steel having a tensile resistance superior to 500 MPa, advantageously between 500 and 2000 MPa before or after heat-treatment, can be used. The weight composition of steel sheet is preferably as follows: 0.03%≤C≤0.50%; 0.3%≤Mn≤3.0%; 0.05%≤Si≤0.8%; 0.015%≤Ti≤0.2%; 0.005%≤Al≤0.1%; 0%≤Cr≤2.50%; 0%≤S≤0.05%; 0%≤P≤0.1%; 0%≤B≤0.010%; 0%≤Ni≤2.5%; 0%≤Mo≤0.7%; 0%≤Nb≤0.15%; 0%≤N≤0.015%; 0%≤Cu≤0.15%; 0%≤Ca≤0.01%; 0%≤W≤0.35%, the balance being iron and unavoidable impurities from the manufacture of steel.

For example, the steel sheet is 22MnB5 with the following composition: 0.20%≤C≤0.25%; 0.15%≤Si≤0.35%; 1.10%≤Mn≤1.40%; 0%≤Cr≤0.30%; 0%≤Mo≤0.35%; 0%≤P≤0.025%; 0%≤S≤0.005%; 0.020%≤Ti≤0.060%; 0.020%≤Al≤0.060%; 0.002%≤B≤0.004%, the balance being iron and unavoidable impurities from the manufacture of steel.

The steel sheet can be Usibor®2000 with the following composition: 0.24%≤C≤0.38%; 0.40%≤Mn≤3%; 0.10%≤Si≤0.70%; 0.015%≤Al≤0.070%; 0%≤Cr≤2%; 0.25%≤Ni≤2%; 0.020%≤Ti≤0.10%; 0%≤Nb≤0.060%; 0.0005%≤B≤0.0040%; 0.003%≤N≤0.010%; 0.0001%≤S≤0.005%; 0.0001%≤P≤0.025%; it being understood that the contents of titanium and nitrogen satisfy Ti/N>3.42; and that the contents of carbon, manganese, chromium and silicon satisfy:

$$2.6\,C + \frac{Mn}{5.3} + \frac{Cr}{13} + \frac{Si}{15} \geq 1.1\%$$

the composition optionally comprising one or more of the following: 0.05%≤Mo≤0.65%; 0.001%≤W≤0.30%; 0.0005%≤Ca≤0.005%, the balance being iron and unavoidable impurities from the manufacture of steel.

For example, the steel sheet is Ductibor®500 with the following composition: 0.040%≤C≤0.100%; 0.80%≤Mn≤2.00%; 0%≤Si≤0.30%; 0%≤S≤0.005%; 0%≤P≤0.030%; 0.010%≤Al≤0.070%; 0.015%≤Nb≤0.100%; 0.030%≤Ti≤0.080%; 0%≤N≤0.009%; 0%≤Cu≤0.100%; 0%≤Ni≤0.100%; 0%≤Cr≤0.100%; 0%≤Mo≤0.100%; 0%≤Ca≤0.006%, the balance being iron and unavoidable impurities from the manufacture of steel.

Steel sheet can be obtained by hot rolling and optionally cold rolling depending on the desired thickness, which can be for example between 0.7 and 3.0 mm.

The invention relates to a steel sheet coated with a metallic coating comprising from 1.0 to 22.0% by weight of zinc, from 0.1 to 1.0% by weight of titanium, from 1.6 to 15.0% by weight of silicon, below 0.5% by weight of magnesium, below 0.05% by weight of La or Ce or both, below 0.2% by weight of Sn and optionally additional elements chosen from Sb, Pb, Ca, Mn, Cr, Ni, Zr, In, Hf or Bi, the content by weight of each additional element being inferior to 0.3% by weight, the balance being aluminum and optionally unavoidable impurities and residuals elements and wherein the microstructure of the coating does not comprise Al—Zn binary phases. Metallic coatings according to the invention have a high sacrificial protection. Indeed, without willing to be bound by any theory, it seems that titanium, in combination with zinc, aluminium and silicon, acts as aluminium depassivating element. Indeed, titanium weakens the layer of alumina naturally present on the surface of the coating and therefore makes easier the contact between the metallic coating and the environment, preferably water film. As a result, the electrochemical potential of the coating becomes more negative and the ability of the coating to bring steel sacrificial protection is increased.

The coating comprises from 0.1 to 1.0%, advantageously from 0.15 to 1.0%, more preferably from 0.15 to 0.5%, preferably from 0.15 to 0.30%, more preferably from 0.20 to 0.30% or from 0.21 to 0.30% of weight of titanium. Indeed, when the amount of titanium is above 1.0%, the high level of corrosion resistance desired is not observed. Additionally, without willing to be bound by any theory, it seems that when the amount of titanium is inside these ranges, the apparition of red rust is minimized and therefore, the protection against corrosion is high.

The coating comprises from 1 to 22%, preferably from 5.0 to 20%, more preferably from 10.0 to 20.0% and advantageously from 10.0 to 15.0% by weight of zinc. Without willing to be bound by any theory, it seems that zinc, in combination with titanium, allows for a decrease of coupling potential coating/steel, in medium containing or which does not contain chloride ions. Thus, coatings according to the present invention allows for a sacrificial cathodic protection.

Advantageously, coatings according to the present invention comprise from 2.05 to 11.0%, preferably from 5.0 to 11.0% and more preferably from 7.0 to 11.0% by weight of silicon. Silicon allows for, among others, high resistance of coated steel sheet at high temperatures. Thus, the coated steel sheets can be used up to 650° C. without risk of scaling of coating. Moreover, silicon prevents the formation of a thick layer of intermetallic iron-zinc when hot-dip galvanization is realized, said layer which can reduce the adhesion and formability of the coating.

Preferably, the coating comprises below 0.2% by weight of magnesium. More preferably, the coating does not comprise Mg.

Preferably, the coating does not comprise La, Ce or both.
Preferably, the coating does not comprise Sn.

Usually, in coatings comprising silicon, aluminium and zinc, the microstructure comprises Zn solid solution in Al phase, Al—Zn binary phases and Si-rich phases. In the present invention, the microstructure of the coating comprises Zn solid solution in Al phase, Si-rich phases and does not comprise Al—Zn binary phases. Indeed, it is thought that titanium modifies the microstructure of the coating. The microstructure of the coating is refined, it becomes more homogeneous. Additionally, zinc is more stabilized in aluminium phase. Finally, without willing to be bound by any theory, there are fewer phases in the coating and therefore less galvanic coupling, so the coated part has a better resistance to corrosion.

Finally, the balance of the coating is aluminium. Aluminium allows for a corrosion protection by barrier effect. It also increases the melting temperature and the evaporation temperature of the coating, thereby to implement more easily, in particular by hot-stamping in a wide range of temperature and time.

The coating can be deposited by any methods known to the man skilled in the art, for example hot-dip galvanization process, electrogalvanization process, physical vapour deposition such as jet vapor deposition or sputtering magnetron. Preferably, the coating is deposited by hot-dip galvanization process.

The bath comprises zinc, silicon and aluminium. It can comprise additional elements chosen from Sb, Pb, Ca, Mn, Cr, Ni, Zr, In, Hf ou Bi, the content by weight of each additional element being less than 0.3%, preferably less than 0.1%, advantageously less than 0.05% by weight. These additional elements can improve among others ductility, coating adhesion on the steel sheet. The man skilled in the art knows the effect of such compounds on the metallic coating and would know how to use them depending on the desired properties.

The bath can also contain unavoidable impurities and residuals elements from feeding ingots or from the passage of the steel sheet in the molten bath. Residual element can be iron with a content up to 5.0%, preferably up to 3% by weight.

The thickness of the coating is usually between 5 and 50 μm, preferably between 10 and 35 μm, advantageously between 12 and 18 μm or between 26 to 31 μm. The bath temperature is usually between 580 and 660° C.

After the deposition of the coating, the steel sheet is usually wiped with nozzles ejecting gas on both sides of the coated steel sheet. The coated steel sheet is then cooled. Preferably, the cooling rate is above or equal to 15° $C.\cdot s^{-1}$ between the beginning of the solidification and the end of the solidification. Advantageously, the cooling rate between the beginning and the end of the solidification is superior or equal to 20° $C.\cdot s^{-1}$.

Then, a skin-pass can be realized and allows work hardening the coated steel sheet and giving it a roughness facilitating the subsequent shaping. A degreasing and a surface treatment can be applied in order to improve for example adhesive bonding or corrosion resistance.

Then, the coated steel sheet according to the invention can be shaped by any method known to the man skilled in the art, for example cold-forming and/or hot-forming.

In a preferred embodiment, the part is obtained by cold-forming, preferably by cold-stamping. In this case, the coated steel sheet is cut to obtain a blank and then cold-stamped in order to obtain a part.

In another preferred embodiment, the part coated is obtained by a press hardening process including the hot-forming. In this case, this method comprises the following steps:

A) the provision of a steel sheet pre-coated with a metallic coating comprising from 1.0 to 22.0% by weight of zinc, from 0.1 to 1.0% by weight of titanium, from 1.6 to 15.0% by weight of silicon, below 0.5% by weight of magnesium, below 0.05% by weight of La or Ce or both, below 0.2% by weight of Sn and optionally additional elements chosen from Sb, Pb, Ca, Mn, Cr, Ni, Zr, In, Hf or Bi, the content by weight of each additional element being inferior to 0.3% by weight, the balance being aluminum and optionally unavoidable impurities and residuals elements, wherein the microstructure of the coating does not comprise Al—Zn binary phases, B) the cutting of the coated steel sheet to obtain a blank,
C) the thermal treatment of the blank at a temperature between 840 and 950° C. to obtain a fully austenitic microstructure in the steel,
D) the transfer of the blank into a press tool,
E) the hot-forming of the blank to obtain a part,
F) the cooling of the part obtained at step E) in order to obtain a microstructure in steel being martensitic or martensito-bainitic or made of at least 75% of equiaxed ferrite, from 5 to 20% of martensite and bainite in amount less than or equal to 10%.

Indeed, after the provision of steel sheet pre-coated with the metallic coating according to the present invention, the steel sheet is cut to obtain a blank. A thermal treatment is applied to the blank in a furnace under non protective atmosphere at an austenitization temperature Tm usually between 840 and 950° C., preferably 880 to 930° C. Advantageously, said blank is maintained during a dwell time tm between 1 to 12 minutes, preferably between 3 to 9 minutes. During the thermal treatment before the hot-forming, the coating forms an alloy layer having a high resistance to corrosion, abrasion, wear and fatigue.

After the thermal treatment, the blank is then transferred to a hot-forming tool and hot-formed at a temperature between 600 and 830° C. The hot-forming comprises the hot-stamping and the roll-forming. Preferably, the blank is hot-stamped. The part is then cooled in the hot-forming tool or after the transfer to a specific cooling tool.

The cooling rate is controlled depending on the steel composition, in such a way that the final microstructure after the hot-forming comprises mostly martensite, preferably contains martensite, or martensite and bainite, or is made of at least 75% of equiaxed ferrite, from 5 to 20% of martensite and bainite in amount less than or equal to 10%.

A coated part according to the invention can thus obtained by cold or hot forming but also by any suitable combination of cold-stamping and hot-forming.

For automotive application, after phosphating step, the part is dipped in an e-coating bath. Usually, the thickness of the phosphate layer is between 1 and 2 μm and the thickness of the e-coating layer is between 15 and 25 μm, preferably inferior or equal to 20 μm. The cataphoresis layer ensures an additional protection against corrosion.

After the e-coating step, other paint layers can be deposited, for example, a primer coat of paint, a basecoat layer and a top coat layer.

Before applying the e-coating on the part, the part is previously degreased and phosphated so as to ensure the adhesion of the cataphoresis.

The invention will now be explained in trials carried out for information only. They are not limiting.

EXAMPLES

For all samples, steel sheets used are 22MnB5. The composition of the steel is as follows: C=0.2252%; Mn=1.1735%; P=0.0126%, S=0.0009%; N=0.0037%; Si=0.2534%; Cu=0.0187%; Ni=0.0197%; Cr=0.180%; Sn=0.004%; Al=0.0371%; Nb=0.008%; Ti=0.0382%; B=0.0028%; Mo=0.0017%; As=0.0023% et V=0.0284%.

All coatings were deposited by hot-dip galvanization process.

Example 1: Electrochemical Behavior Test

Trials 1 to 5 were prepared and subjected to an electrochemical potential test.

Firstly, after the deposition of the coating, Trials 1 to 4 were cut in order to obtain a blank. Blanks were then heated at a temperature of 900° C. during a dwell time of 5 minutes. Blanks were transferred into a press tool and hot-stamped in order to obtain parts. Parts were cooled to obtain a hardening by martensitic transformation.

Then, a test consisting in measuring the electrochemical potential of the coated steel surface sheet was realized for all trials. Steel sheets and coatings were separated and dipped in a solution comprising 5% by weight of sodium chloride at pH 7. A saturated calomel electrode (SCE) was also immersed into the solution. The coupling potential of the surface was measured over time. Results are shown in the following Table 1:

| Trials | Samples | Coating | | | | Thickness | Coupling potential |
| | | Al | Si | Zn | Ti | (µm) | (V/SCE) |
|---|---|---|---|---|---|---|---|
| 1* | 1 | 80.9 | 9 | 10 | 0.1 | 25 | −1.02 |
| 2* | 2 | 80.5 | 9 | 10 | 0.5 | 25 | −1.02 |
| 3* | 3 | 70.9 | 9 | 20 | 0.1 | 25 | −1.06 |
| 4* | 4 | 70.5 | 9 | 20 | 0.5 | 25 | −1.06 |
| 5 | 5 | 0.2 | — | 99.8 | — | 10 | −1.00 |

*examples according to the invention.

Trials 1 to 4 are sacrificial such as zinc coating. Coupling potentials are under −0.78V/SCE as required.

Example 2: Corrosion Test

Example 2a

Trials 6 to 9 were subjected to a corrosion test to evaluate the protection of the coated steel sheets.

After the deposition of the coating, all trials were scratched. They were submitted to 1 and then 6 corrosion cycles according to the norm VDA 233-102 represented in FIG. 1. To this end, trials were put in a chamber wherein an aqueous solution of sodium chloride of 1% by weight was vaporized on trials with a rate of flow of 3 mL·h$^{-1}$. The temperature varied from 50 to −15° C. and the humidity rate varied from 50 to 100%. FIG. 1 illustrates one cycle corresponding to 168 hours, i.e. one week.

The presence of corrosion on coated steel sheet was observed by naked eyes: 0 means excellent, in other words, there is little or no corrosion and 5 means very bad, in other words, there is a lot of corrosion. Results are shown in the following Table 2a:

| Trials | Samples | Coating | | | | Thickness | Corrosion | |
| | | Al | Si | Zn | Ti | (µm) | 1 cycle | 6 cycles |
|---|---|---|---|---|---|---|---|---|
| 6 | 6 | 91 | 9 | — | — | 25 | 1 | 2 |
| 7 | 7 | 71 | 9 | 20 | — | 25 | 0 | 3 |
| 8* | 3 | 70.9 | 9 | 20 | 0.1 | 25 | 0 | 1 |
| 9* | 4 | 70.5 | 9 | 20 | 0.5 | 25 | 0 | 1 |

*examples according to the invention.

Trials 8 and 9 show excellent protection against corrosion even after 6 corrosion cycles.

Example 2b

Trials 10 to 13 were subjected to a corrosion test to evaluate the protection of the coated steel sheets.

After the deposition of the coating, Trial 6, 8 and 9 were cut in order to obtain a blank. Blanks were then heated at a temperature of 900° C. during a dwell time of 5 minutes. Blanks were transferred into a press tool and hot-stamped in order to obtain part. Parts were cooled to obtain a hardening by martensitic transformation.

Then, all trials were scratched on a width of 0.5, 1 and 2 mm. They were submitted to 1 and then 6 corrosion cycles according to the norm VDA 233-102 represented in FIG. 1.

The presence of corrosion on coated steel sheet was observed by naked eyes: 0 means excellent, in other words, there is little or no corrosion and 5 means very bad, in other words, there is a lot of corrosion. Results are shown in the following Table 2b:

| Trials | Samples | Coating | | | | Corrosion | |
| | | Al | Si | Zn | Ti | 1 cycle | 6 cycles |
|---|---|---|---|---|---|---|---|
| 10 | 6 | 91 | 9 | — | — | 2 | 4 |
| 11* | 3 | 70.9 | 9 | 20 | 0.1 | 0 | 2 |
| 12* | 4 | 70.5 | 9 | 20 | 0.5 | 0 | 2 |
| 13 | 5 | 0.2 | — | 99.8 | — | 0 | 1 |

*examples according to the invention.

Trials 11 and 12 show good protection against corrosion, even after 6 corrosion cycles.

Example 2c

Trial 14 and 15 were subjected to a corrosion test to evaluate the protection of the coated steel sheets.

After the deposition of the coating, they were submitted to 6 corrosion cycles according to the norm VDA 233-102 represented in FIG. 1.

Dry mass gain and mass loss were measured after end of the test. Mass gain means the weight of trials with corrosion products formed during the test. The more the mass gain of the coated sheet, the higher it was corroded. Mass loss means the mass of coating consumed during the corrosion test.

Results are shown in the following Table 2c:

| Trials | Samples | Coating Al | Si | Zn | Ti | Thickness (mm) | Mass gain (g·m⁻²) | Mass loss (g·m⁻²) |
|---|---|---|---|---|---|---|---|---|
| 14* | 8 | 87.59 | 2.1 | 10.2 | 0.11 | 2 | 41 | 9 |
| 15 | 5 | 0.2 | — | 99.8 | — | 2 | 154 | 169 |

*examples according to the invention.

We can see that trial 14 was significantly less corroded than Trial 15.

Example 3: Cut Edge Test

Example 3a: Cut Edge Potential Test

Trials 16 to 18 were prepared and subjected to an electrochemical potential test.

Cut edge trials were prepared using a 1 mm thick piece of coating and four 2.5-mm thick plates of steel. Coatings and steel plates were separated with a plastic foil. Wires attached to each plate allowed for galvanic connection between them and galvanic current monitoring. Cut edge trials were exposed to the norm N-VDA test for 1 week. Galvanic current measured in Nanoampere (nA) was registered in three stages of the cycle:

I. at 35° C. and 95% RH (day 1, 3, 4, 6 and 7),
II. at 50° C. and 90% RH (day 1 and 4) and
III. at 35° C. during the salt spray application (day 1).

Results are shown in the following Table 3a.

| Trials | Samples | Coating Al | Si | Zn | Ti | Stage I | Stage II | Stage III |
|---|---|---|---|---|---|---|---|---|
| 16 | 9 | 97.98 | 2.02 | — | — | 1700 | 800 | 200 |
| 17* | 8 | 87.59 | 2.1 | 10.2 | 0.11 | 1600 | 6000 | 850 |
| 18 | 5 | 0.2 | — | 99.8 | — | 500 | 1800 | 200 |

*examples according to the invention.

It can be seen that in Trial 17, the coating tends to increase the current, i.e. the active element, being the titanium, increases steel protection. Trial 17 provides excellent performance with respect to Trials 16 and 18.

Example 3b: Cut Edge Corrosion Test

For all Trials 16 to 18, the extent of corrosion was assessed at the end of the test realized in Example 3a. The presence of corrosion on trials was observed by naked eyes: 1 means that there is no corrosion, 2 means that there is a partial corrosion and 3 means that it is full corrosion. Results are shown in the following Table 3b.

| Trials | Samples | Coating Al | Si | Zn | Ti | Red rust |
|---|---|---|---|---|---|---|
| 16 | 9 | 97.98 | 2.02 | — | — | 3 |
| 17* | 8 | 87.59 | 2.10 | 10.2 | 0.11 | 2 |
| 18 | 5 | 0.2 | — | 99.8 | — | 3 |

*example according to the invention.

There is a reduction in the corrosion extent of the steel for Trial 17.

The invention claimed is:

1. A steel sheet coated with a metallic coating, the metallic coating comprising:
   5.0 to 22.0% by weight of zinc;
   0.1 to 1.0% by weight of titanium;
   1.6 to 15.0% by weight of silicon;
   less than 0.5% by weight of magnesium;
   less than 0.05% by weight of La;
   less than 0.05% by weight of Ce;
   less than 0.2% by weight of Sn; and
   a balance of the composition being aluminum and unavoidable impurities and residual elements; and
   a microstructure of the coating does not comprise Al—Zn binary phases.

2. The steel sheet according to claim 1, wherein the coating optionally includes additional elements chosen from Sb, Pb, Ca, Mn, Cr, Ni, Zr, In, Hf or Bi, a content by weight of each additional element being less than 0.3% by weight.

3. The steel sheet according to claim 1, wherein the coating comprises from 5.0 to 20.0% by weight of zinc.

4. The steel sheet according to claim 3, wherein the coating comprises from 10.0 to 20.0% by weight of zinc.

5. The steel sheet according to claim 1, wherein the coating comprises from 0.15 to 1.0% of weight of titanium.

6. The steel sheet according to claim 5, wherein the coating comprises from 0.15 to 0.50% of weight of titanium.

7. The steel sheet according to claim 6, wherein the coating comprises from 0.15 to 0.30% of weight of titanium.

8. The steel sheet according to claim 7, wherein the coating comprises from 0.20 to 0.30% of weight of titanium.

9. The steel sheet according to claim 8, wherein the coating comprises from 0.21 to 0.30% of weight of titanium.

10. The steel sheet according to claim 1, wherein the coating comprises from 2.05 to 11.0% by weight of silicon.

11. The steel sheet according to claim 10, wherein the coating comprises from 5.0 to 11.0% by weight of silicon.

12. The steel sheet according to claim 11, wherein the coating comprises from 7.0 to 11.0% by weight of silicon.

13. The steel sheet according to claim 12, wherein the coating comprises below 0.2% by weight of magnesium.

14. The steel sheet according to claim 1, wherein the microstructure of the coating comprises Zn solid solution in Al phase and Si phases.

15. The steel sheet according to claim 1, wherein a thickness of the coating is between 5 and 50 μm.

16. A part comprising:
   a steel sheet coated with a metallic coating, the metallic coating comprising:
   5.0 to 22.0% by weight of zinc;
   0.1 to 1.0% by weight of titanium;
   1.6 to 15.0% by weight of silicon;
   less than 0.5% by weight of magnesium;
   less than 0.05% by weight of La;
   less than 0.05% by weight of Ce;
   less than 0.2% by weight of Sn; and
   a balance of the composition being aluminum and unavoidable impurities and residual elements; and
   a microstructure of the coating does not comprise Al—Zn binary phases;
   the steel sheet subject to hot-forming or cold-forming or both to form the part.

17. An automotive vehicle comprising:
   the part according to claim 16.

18. The steel sheet according to claim 4, wherein the coating comprises from 10.0 to 15.0% by weight of zinc.

19. The steel sheet according to claim 1, wherein the metallic coating comprises:

10.0 to 20.0% by weight of zinc;
0.10 to 0.50% by weight of titanium;
7.0 to 11.0% by weight of silicon; and
at least 70.5% by weight of aluminum.

20. The steel sheet according to claim 1, wherein the steel sheet has a coupling potential of less than −0.78V/SCE or less.

21. The steel sheet according to claim 1, wherein the steel sheet has a coupling potential of from −0.78V/SCE to −1.4V/SCE.

22. The steel sheet according to claim 1, wherein the metallic coating does not include Mg or Ca.

23. The steel sheet according to claim 1, wherein the metallic coating consists of:
    5.0 to 22.0% by weight of zinc;
    0.1 to 1.0% by weight of titanium;
    1.6 to 15.0% by weight of silicon;
    less than 0.05% by weight of La;
    less than 0.05% by weight of Ce;
    less than 0.2% by weight of Sn; and
    less than 0.3% by weight of each of Sb, Pb, Mn, Cr, Ni, Zr, In, Hf or Bi;
    the balance of the composition being aluminum and unavoidable impurities and residual elements.

24. The steel sheet according to claim 23, wherein the metallic coating consists of:
    5.0 to 22.0% by weight of zinc;
    0.1 to 1.0% by weight of titanium;
    1.6 to 15.0% by weight of silicon; and
    the balance of the composition being aluminum and unavoidable impurities and residual elements.

25. The steel sheet according to claim 1, wherein the microstructure is martensitic, martensito-bainitic or includes at least 75% equiaxed ferrite, from 5 to 20% martensite and 10% or less bainite.

* * * * *